(12) United States Patent
Caldarone (10) Patent No.: US 8,646,765 B2
(45) Date of Patent: Feb. 11, 2014

(54) END CLAMP AND METHOD OF USE THERE FOR

(75) Inventor: Andrew C. Caldarone, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 697 days.

(21) Appl. No.: 12/775,246

(22) Filed: May 6, 2010

(65) Prior Publication Data
US 2011/0272873 A1 Nov. 10, 2011

(51) Int. Cl.
*B25B 5/14* (2006.01)
(52) U.S. Cl.
USPC .............................. 269/111; 269/119; 269/43
(58) Field of Classification Search
USPC .............. 269/43, 45, 104, 109, 111, 118, 119
See application file for complete search history.

(56) References Cited

U.S. PATENT DOCUMENTS

| 282,427 | A | * | 7/1883 | Weaver | 269/55 |
|---|---|---|---|---|---|
| 435,405 | A | | 11/1890 | Cushman | |
| 729,727 | A | | 6/1903 | Bullard | |
| 1,064,539 | A | | 6/1913 | Ream | |
| 1,704,893 | A | * | 3/1929 | Harrison | 29/258 |
| 1,730,510 | A | * | 10/1929 | Jensen | 269/42 |
| 2,209,972 | A | * | 8/1940 | Horwitt | 40/739 |
| 2,448,881 | A | | 9/1948 | Glynn | |
| 2,667,356 | A | | 1/1954 | Forward | |
| 2,908,300 | A | * | 10/1959 | Hahn | 83/763 |
| 3,137,492 | A | * | 6/1964 | Dussold | 269/41 |
| 3,170,348 | A | | 2/1965 | McFerren | |
| 3,433,491 | A | | 3/1969 | Loguski et al. | |
| 3,604,717 | A | | 9/1971 | Hohwart | |
| 3,663,029 | A | | 5/1972 | Dexter | |
| 3,676,944 | A | * | 7/1972 | Eubank, Jr. | 40/793 |
| 3,849,920 | A | * | 11/1974 | Trowbridge | 40/784 |
| 3,958,352 | A | * | 5/1976 | Eubank, Jr. | 40/793 |
| 4,019,270 | A | * | 4/1977 | Trowbridge | 40/741 |
| 4,023,787 | A | * | 5/1977 | Violette | 269/41 |
| 4,624,466 | A | | 11/1986 | Steinberger | |
| 4,647,028 | A | | 3/1987 | Yang | |
| 4,881,726 | A | * | 11/1989 | Jolkovski | 269/41 |
| 5,022,636 | A | | 6/1991 | Swann | |
| 5,297,485 | A | * | 3/1994 | Bond | 108/55.1 |
| 5,351,943 | A | | 10/1994 | Milz | |
| 5,365,682 | A | * | 11/1994 | Eubank, Jr. | 40/746 |
| 5,374,040 | A | | 12/1994 | Lin | |
| 5,649,694 | A | | 7/1997 | Buck | |
| 5,711,195 | A | * | 1/1998 | Koelling | 82/1.11 |
| 5,791,661 | A | | 8/1998 | Reyes | |
| 6,062,553 | A | | 5/2000 | Strehl | |
| 6,182,371 | B1 | * | 2/2001 | Newman | 33/194 |
| 6,598,867 | B2 | | 7/2003 | Martinez | |

(Continued)

*Primary Examiner* — Brent W Herring
(74) *Attorney, Agent, or Firm* — Shannon V. McCue; Hahn Loeser & Parks LLP (57) ABSTRACT

A clamping mechanism is described which includes an end clamp which may include a face plate, a pair of opposing first jaws operably attached to the face plate selectively positionable toward and away from one another, each of the pair of first jaws having a first jaw inner clamp member and a first jaw outer clamp member forming a nest there between, and a pair of opposing second jaws operably attached to the face plate selectively positionable toward and away from one another, each of the pair of second jaws having a second jaw inner clamp member and a second jaw outer clamp member forming a nest there between.

15 Claims, 10 Drawing Sheets

(56) References Cited

U.S. PATENT DOCUMENTS 6,811,131 B2 * 11/2004 Kuo ................... 248/346.03
6,896,249 B1 5/2005 Ferrara
7,568,683 B1 8/2009 Lovas
7,950,636 B2 * 5/2011 Kinnison et al. ............... 269/41

* cited by examiner

END CLAMP AND METHOD OF USE THERE FOR

TECHNICAL FIELD

The invention described herein relates generally to means for clamping and positioning a workpiece. Additionally, the invention relates to an end clamp accommodating various shaped workpieces.

BACKGROUND OF THE DISCLOSURE

Structural beams such as I-beams and hollow structural section (HSS) beams and columns have been fabricated by welding together various components forming the beam. In one fabrication process, flat steel plates are positioned and welded into a desired beam shape. The beams may be fabricated in a plurality of steps, including securing the flat steel plates in assembly fixtures or welding jigs to hold the components in a desired position, then tack welding the flat steel plates to fix the components in the desired shape. In a subsequent step, the flat steel plates are structurally welded to complete the beam. The structural welding may be performed removed from the welding jigs to enable the welding jigs to be used for production of another beam.

Automated welding and robotics have been utilized within steel fabrication systems to increase production and/or to reduce human exposure to harsh and/or undesirable working conditions. Such systems may include an automated carriage that moves a welder along components to be joined, which are positioned in the welding jig. In yet another alternative, a welding system may include a welding robot that moves a welder into desired positions for welding. In the case of beam fabrication, an operator may tack weld the components positioned in the assembly fixtures or welding jigs in the desired beam shape. Alternatively, a robot may be used to tack weld the beam components using a hand-operated welder to join the plates in the desired beam shape. Subsequently, the tack-welded beam may be removed to a structural weld station, where the components are structurally welded to complete the beam. The structural weld station may be an automated weld station including an arc welder positioned on a movable carriage to complete the structural welds. In the automated weld station, the welder may be positioned in desired location relative to the workpiece, and the welder welds the workpieces as the automated carriage moves along a desired path.

In view of the foregoing problems and shortcomings of existing steel fabrication systems, the present application describes a method and apparatus to overcome these shortcomings.

SUMMARY OF THE DISCLOSURE

In accordance with the present invention, there is provided an end clamp which includes: a face plate; a pair of opposing first jaws operably attached to the face plate selectively positionable toward and away from one another, each of the pair of first jaws comprising a first jaw inner clamp member and a first jaw outer clamp member forming a nest there between; and a pair of opposing second jaws operably attached to the face plate selectively positionable toward and away from one another, each of the pair of second jaws comprising a second jaw inner clamp member and a second jaw outer clamp member forming a nest there between. Each of the pair of opposing first jaws may be operably positioned in a clamp body comprising a threaded drive member threadably engaging the first jaw.

Also within the scope of the invention is a means for clamping a workpiece which includes: a face plate; a pair of first means for clamping, each of the pair comprising a first means for nesting a workpiece selectively positionable toward and away from one another; and a pair of second means for clamping, each of the pair comprising a second means for nesting a workpiece selectively positionable toward and away from one another. The means for clamping a workpiece may include a means for moving each of the pair of first means for clamping toward and away from the other.

Also within the scope of the invention is a method of clamping a workpiece comprising: providing an end clamp which includes a face plate, a pair of opposing first jaw clamps operably attached to the face plate selectively positionable toward and away from one another, each of the pair of first jaw clamps comprising a first jaw inner clamp member and a first jaw outer clamp member forming a nest there between, and a pair of opposing second jaw clamps operably attached to the face plate selectively positionable toward and away from one another, each of the pair of second jaw clamps comprising a second jaw inner clamp member and a second jaw outer clamp member forming a nest there between; providing a workpiece comprising an end and at least two opposing side surfaces, positioning a portion of the end of the workpiece in the nest of each first jaw; and clamping the opposing side surfaces of the workpiece between the outer clamp member of each first jaw. The method of clamping a workpiece may include steps of positioning a portion of the end of the workpiece in the nest of each second jaw, and clamping the workpiece between the outer clamp member of each second jaw.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE DRAWINGS

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
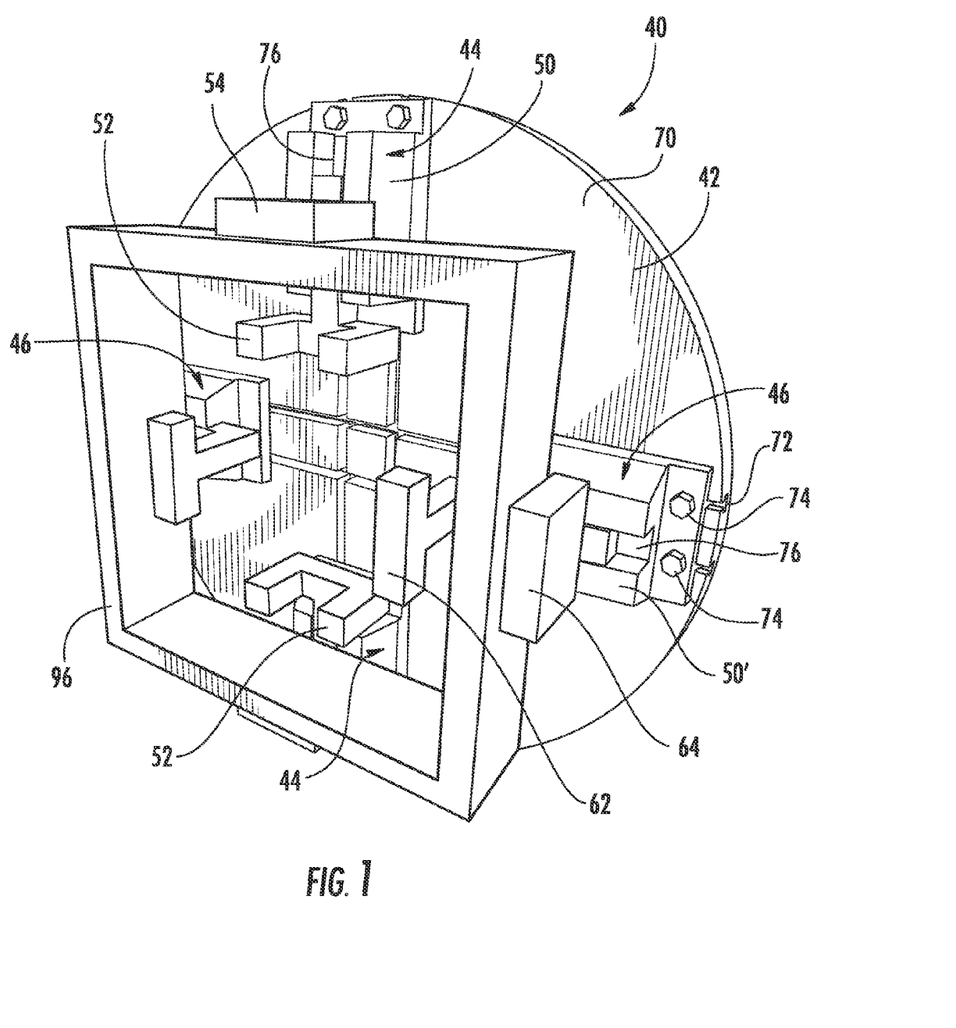
FIG. 1 is a perspective view of an end clamp of the present disclosure clamping an end portion of a hollow structural section.
Figure 2:
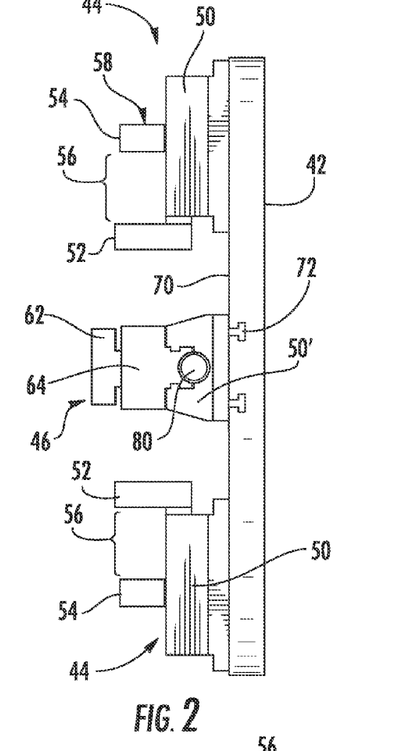
FIG. 2 is an side view of the end clamp of FIG. 1.
Figure 3:
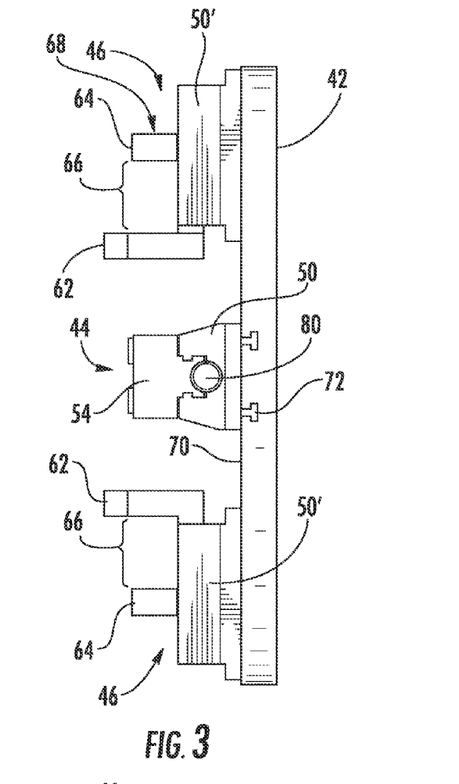
FIG. 3 is an top view of the end clamp of FIG. 1.

Referring now to the drawings wherein the showings are for purposes of illustrating the preferred embodiment of the invention only and not for purposes of limiting the same, as illustrated in FIGS. 1 through 3, end clamp 40 includes face plate 42, a pair of opposing first jaw clamps 44, and a pair of opposing second jaw clamps 46. The pair of first jaw clamps 44 may be operably attached to face plate 42 selectively positionable toward and away from one another. Each of the pair of first jaw clamps 44 comprise clamp body 50 and first movable jaw 58. The first movable jaw 58 may include first jaw inner clamp member 52 and first jaw outer clamp member 54 forming nest 56 there between.

The pair of second jaw clamps 46 may be operably attached to face plate 42 selectively positionable toward and away from one another. Each of the pair of second jaw clamps 46 comprise body 50' and second movable jaw 68. The second movable jaw may include second jaw inner clamp member 62 and second jaw outer clamp member 64 forming nest 66 there between.

Figure 8:
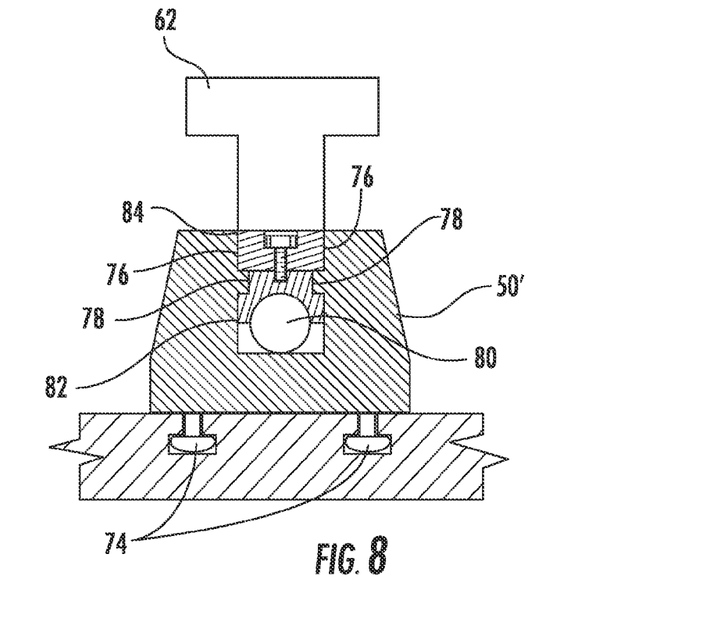
FIG. 8 is a cross sectional view through the jaw clamp of FIG. 6.

As shown in FIG. 1, face plate 42 may include substantially flat mounting surface 70. The mounting surface 70 may include one or more T-grooves 72 as shown in FIGS. 1 through 3 for releasably attaching jaw clamps 44, 46 to mounting surface 70. Each jaw clamp 44, 46 may comprise one or more securing members 74, each securing member 74 cooperatively positionable within T-groove 72 and adapted to operably attach jaw clamp 44, 46 to mounting surface 70. Securing member 74 may be a T-bolt as shown in FIG. 8. Alternatively, securing member 74 may be a threaded plate adapted for receiving a bolt, a T-groove retaining clamp, or other securing member adapted to attach jaw clamp 44, 46 to face plate 42. Jaw clamp 44, 46 may be adapted to be positionable along the T-groove when securing member 74 is loosened to accommodate workpieces of various sizes.

Each jaw clamp 44, 46 may be secured to mounting surface 70 using one T-groove. Alternatively, each jaw clamp 44, 46 may be secured to mounting surface 70 using two or more T-grooves as desired to accommodate the design loads of the end clamp.

In one embodiment, face plate 42 comprises a plurality of threaded mounting holes (not shown) in desired locations on mounting surface 70 and jaw clamps 44, 46 may be bolted to the mounting surface 70 using the threaded mounting holes. The jaw clamps 44, 46 may be affixed to face plate 42 using other mounting techniques as desired, such as welds, clamps, pins, or other mounting techniques.

Figures 6, 7:
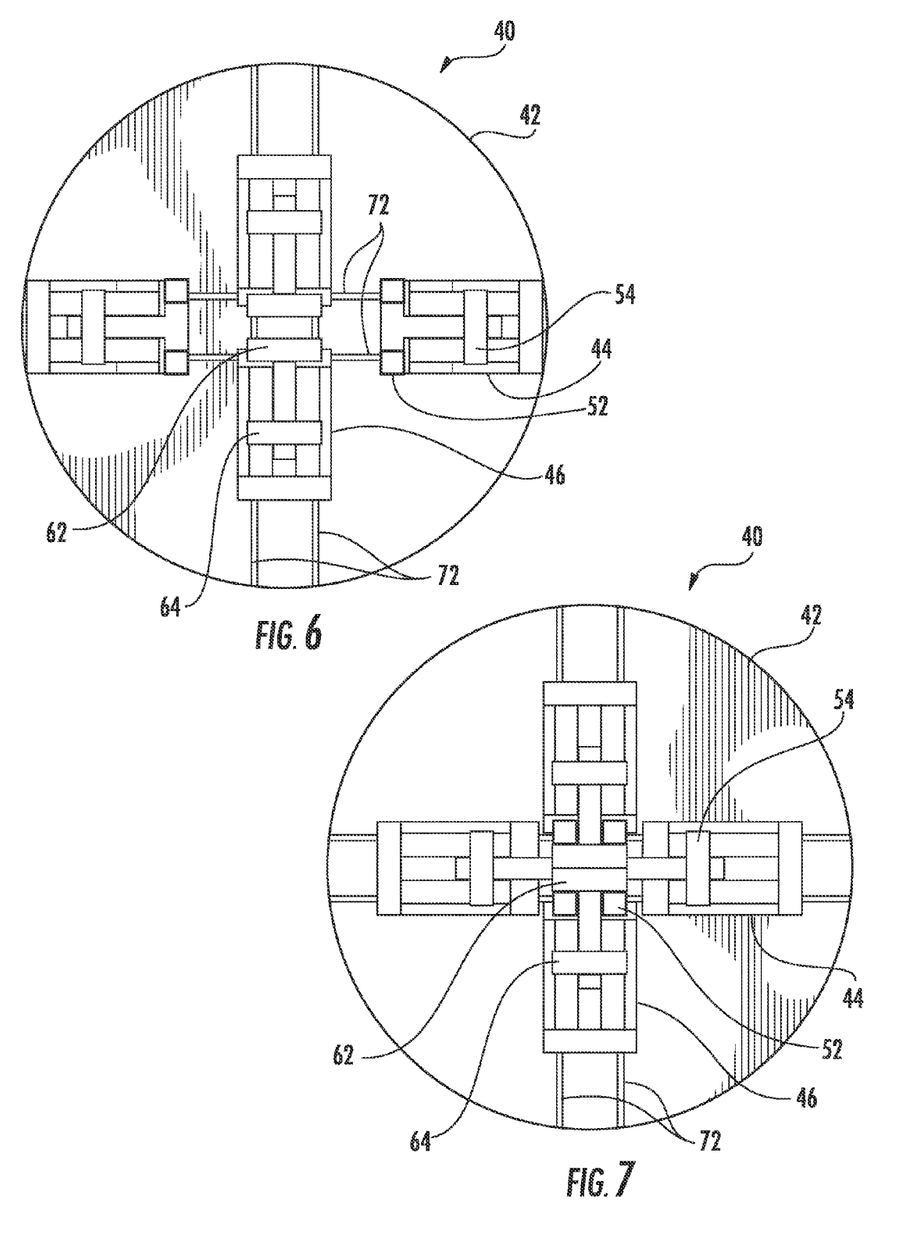
FIG. 6 is a plan view of the end clamp of FIG. 1.
FIG. 7 is a plan view of the end clamp of FIG. 1 with jaws extended.

Jaw clamps 44, 46 may be radially positioned on face plate 42 as shown in FIGS. 6 and 7. In one embodiment, the pair of first jaw clamps 44 is radially positioned and the pair of second jaw clamps 46 is not radially positioned and oriented as desired to accommodate the shape of the workpiece (not shown). In either case, each jaw clamp 44, 46 in an operative pair of jaw clamps may be linearly opposed. Alternatively, operative pair of jaw clamps 44, 46 may not be linearly opposed, instead oriented relative to the workpiece as desired on the face plate 42 to accommodate the shape of the workpiece (not shown).

Mounting surface 70 and face plate 42 may have a circular shape as shown in FIGS. 6 and 7. Alternatively, mounting surface 70 and face plate 42 may have any desired shape and contour as desired for the end clamp application, such as elliptical, rectangular, square, or other desired shapes. Face plate 42 is shown herein as a plate member having a substantially flat mounting surface 70. However, the face plate and mounting surface 70 may be any thickness, shape, and contour as desired to accommodate the structural loading of the face plate and accommodate the shape and size of the workpiece. Face plate 42 may be approximately circular in shape and between about 60 and 72 inches in diameter. Alternatively, the face plate may be between 12 and 60 inches in diameter. In yet another alternative, the face plate may be between 72 and 108 inches in diameter, or larger as desired for the application.

Figure 4:
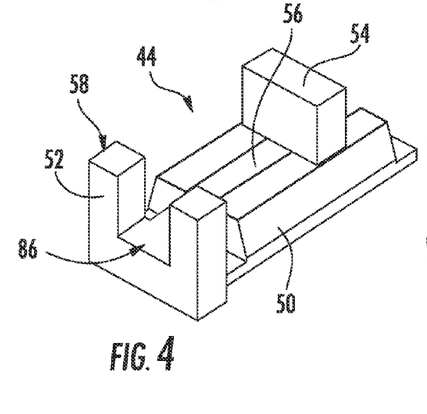
FIG. 4 is a perspective view of a jaw clamp of the end clamp of the present disclosure.
Figure 5:
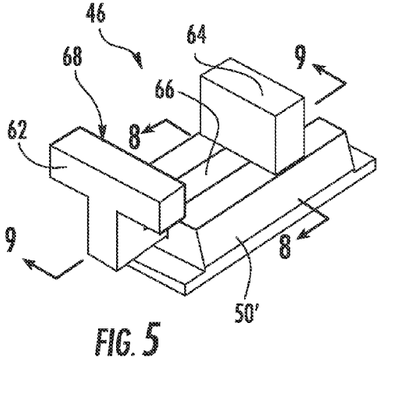
FIG. 5 is a perspective view of an alternative jaw clamp of the end clamp of the present disclosure.
Figure 9:
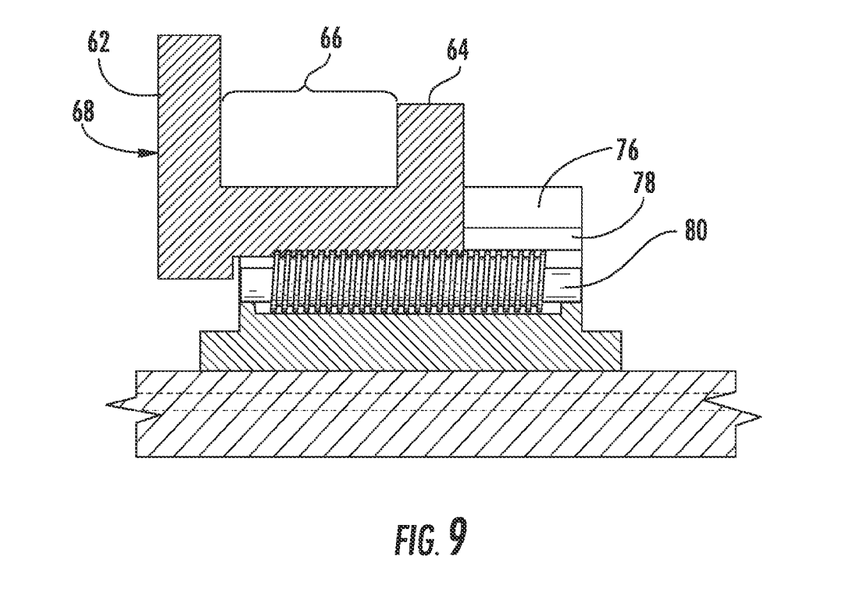
FIG. 9 is a cross sectional view through the jaw clamp of FIG. 5.

First and second jaw clamps 44, 46 are shown in FIGS. 4 and 5, respectively. As shown in FIGS. 8 and 9, clamp body 50, 50' has a generally longitudinal aperture 76 adapted for movable jaw 58, 68 to translate along the longitudinal aperture 76 and along the body 50, 50'. Longitudinal aperture 76 and movable jaw 58, 68 may include tongue and groove engagement 78 to retain movable jaw 58, 68 in body 50, 50' and transfer certain clamping loads from the movable jaw to the body. Threaded drive member 80 is rotatably positioned in body 50, 50' along longitudinal aperture 76. Lower portion 82 of movable jaw 58, 68 may be threaded corresponding to and in threaded engagement with threaded drive 80 such that movable jaw 58, 68 moves along longitudinal aperture 76 and body 50, 50' in a clamping direction when threaded drive member 80 is rotated in one direction, and movable jaw 58 moves in the opposite direction along longitudinal aperture 76 and body 50 when threaded drive 80 is rotated in the opposite rotation.

In one embodiment, movable jaw 58, 68 may be an integral part cast or machined in one piece. Alternatively, movable jaw 58, 68 may be assembled from two or more parts. In one embodiment, threaded lower portion 82 of movable jaw 58, 68 may be installed in body 50, 50' as a separate part and subsequently upper portion 84 including inner clamp member 52, 62 and outer clamp member 54, 64 fastened to lower portion 82 as shown in FIG. 8.

Movable jaws 58, 68 include inner clamp member 52, 62 and outer clamp member 54, 64 as shown in FIGS. 2 through 5. Inner clamp member 52, 62 may be positioned at the leading end toward the clamping direction of movable jaw 58, 68. Outer clamp member 54, 64 may be positioned adjacent the tailing end of movable jaw 58, 68, with nest 56, 66 between inner clamp member 52, 62 and outer clamp member 54, 64. Alternatively, outer clamp member 54, 64 may be positioned along movable jaw 58, 68 offset a desired distance from inner clamp member 52, 62 forming nest 56, 66 between inner clamp member 52, 62 and outer clamp member 54, 64. The distance between inner clamp member 52, 62 and outer clamp member 54, 64 may be selected to accommodate the size and shape of various workpieces desired to be positioned in end clamp 40.

Outer clamp member 54, 64 may be rectangular in shape as shown in FIGS. 4 and 5. Alternatively, outer clamp member 54, 64 may be square, elliptical or other shape as desired for the application. In one embodiment, first jaw outer clamp member 54 has a different shape than second jaw outer clamp member 64. The surface of outer clamp member 54, 64 adapted to engage the workpiece may include a textured surface, such as a grit or bead blasted surface, grooved surface, ridged surface, a diamond pattern, or other surface textures as desired.

Figure 14:
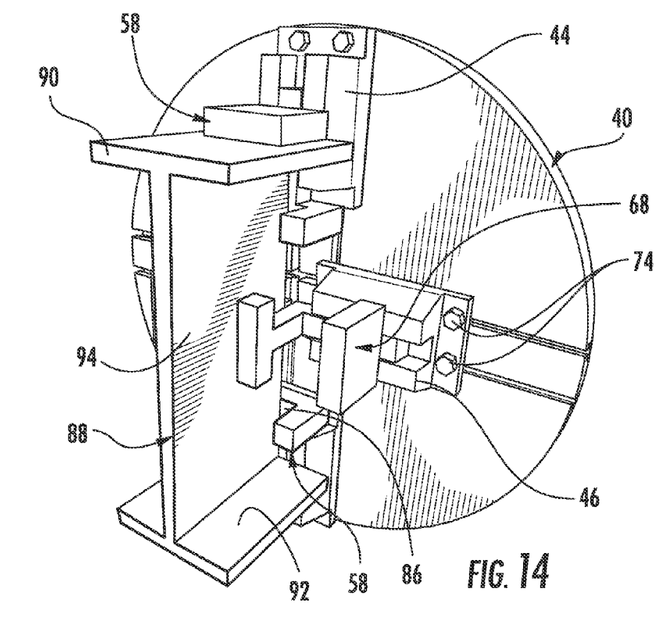
FIG. 14 is perspective view of the end clamp of the present disclosure clamping an end portion of an I-beam.

First jaw inner clamp member 52 may include aperture 86 extending through first jaw inner clamp member 52. Nest 56 may extend through aperture 86 of first jaw inner clamp member 52 providing first jaw inner clamp member 52 with a U shape as shown in FIG. 4. As best shown in FIG. 14, aperture 86 may be positioned to enable a workpiece such as I-beam 88 to be clamped between the pair of first jaw clamps 44 having upper flange 90 of the I-beam positioned in nest 56 of one movable jaw 58 and lower flange 92 of the I-beam positioned in nest 56 of the opposite movable jaw 58, with web 94 of the I-beam in nest 56 passing through apertures 86. Alternatively, first jaw inner clamp member 52 may be any shape as desired for the clamping application, such as rectangular, square, elliptical, or other shape to accommodate desired workpiece geometry. The surface of first jaw inner clamp member 52 adapted to engage the workpiece may include a textured surface, such as a grit or bead blasted surface, grooved surface, ridged surface, a diamond pattern, or other surface textures as desired.

Second jaw inner clamp member 62 may be a T-shaped member as shown in FIG. 5. T-shaped inner clamp member 62 may be shaped such that at least a portion of first jaw inner clamp member 52 may be operably positioned between face plate 42 and at least a portion of second jaw inner clamp member 62 when second jaw inner clamp member 62 is in an extended position, as shown in FIG. 7. Alternatively, second jaw inner clamp member 62 may be any shape as desired for the clamping application, such as rectangular, square, elliptical, or other shape to accommodate desired workpiece geometry. Second jaw inner clamp member 62 may be used to clamp a workpiece such as I-beam 88 with web 94 of the I-beam clamped between the pair of second jaw inner clamp member 62. The surface of second jaw inner clamp member 62 adapted to engage the workpiece may include a textured surface, such as a grit or bead blasted surface, grooved surface, ridged surface, a diamond pattern, or other surface textures as desired.

As shown in FIG. 1, end clamp 40 may be used for securing and positioning a workpiece such as the end of hollow structural section (HSS) beam 96. The HSS beam may be positioned in end clamp 40 such that outer clamp members 54, 64 are used to clamp the workpiece. In this example, the HSS beam walls are positioned in nests 56, 66. Each nest 56, 66 is constrained on at least two sides by inner clamp member 52, 62 and outer clamp member 54, 64.

Figure 10:
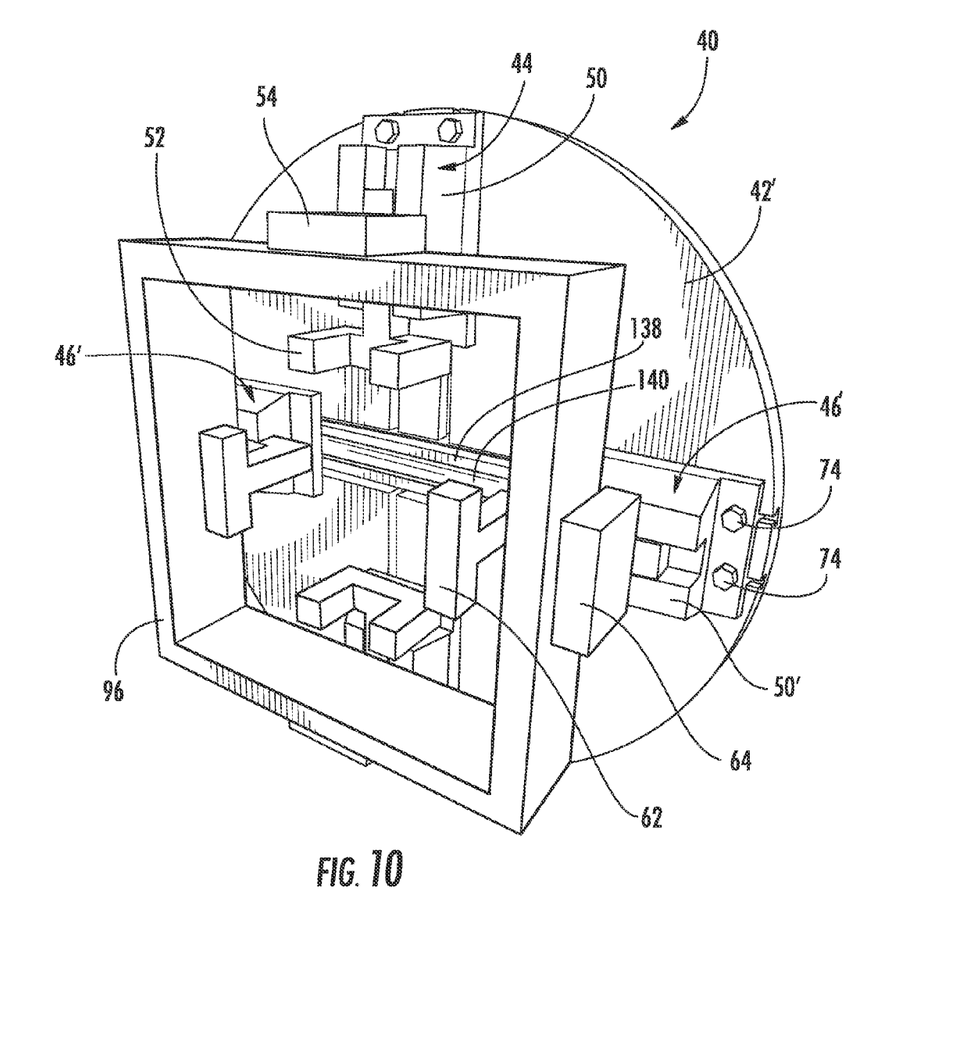
FIG. 10 is a perspective view of an alternative jaw clamp of the present disclosure.
Figure 11:
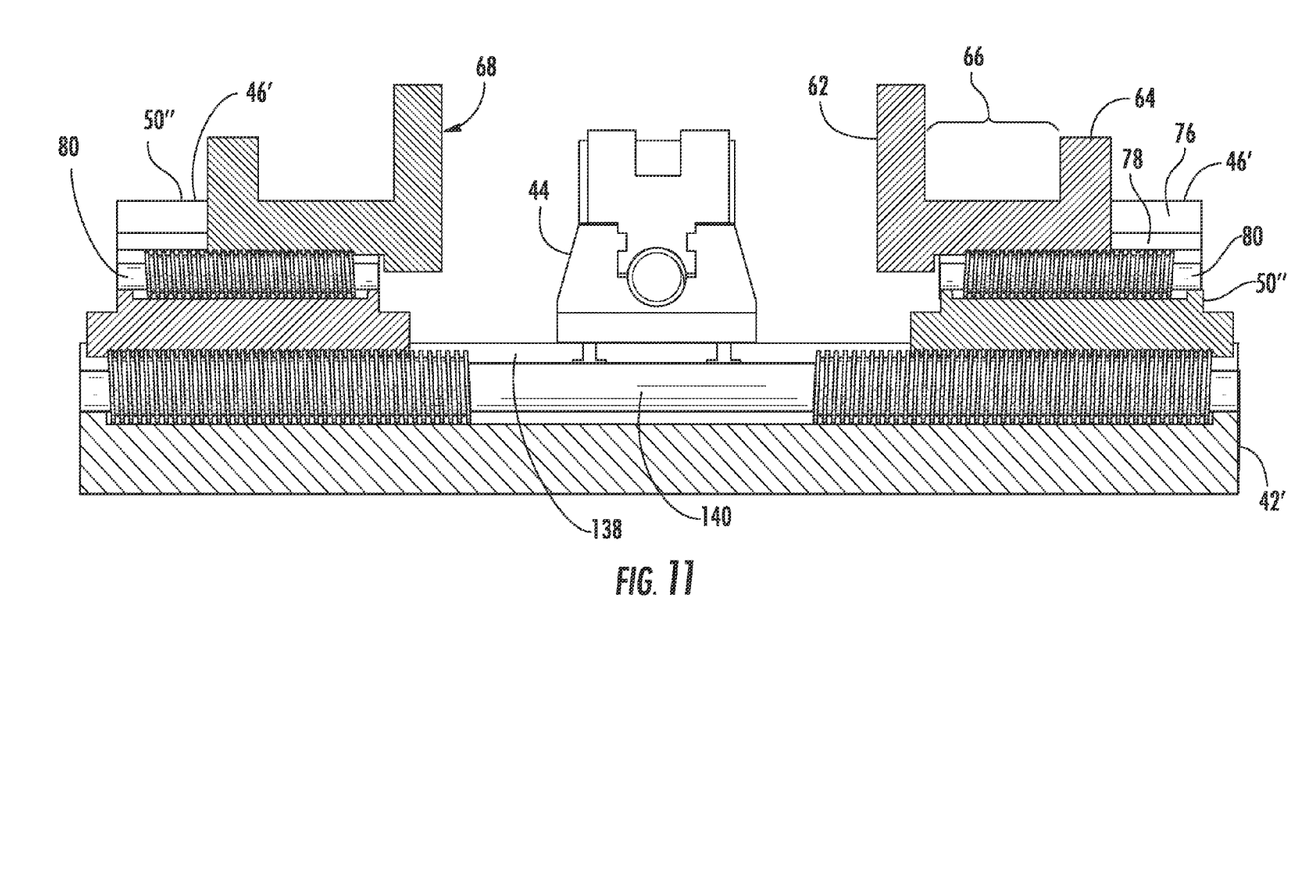
FIG. 11 is a cross sectional view through the jaw clamp of FIG. 10.

Face plate 42 may include a face plate threaded drive 140 threadably engaging at least one clamp body 50 adapted for moving the clamp body along face plate 42 as the face plate threaded drive rotates. In one example shown in FIGS. 10 and 11, face plate 42' may include at least one face plate threaded drive 140 operably positioned in a longitudinal slot 138 beneath a pair of jaw clamps 46', face plate threaded drive 140 threadably engaging at least one of the pair of jaw clamps 46' and adapted for moving at least one jaw clamp 46' along the face plate as face plate threaded drive 140 rotates. As shown in FIG. 11, face plate threaded drive 140 may comprise a left-handed thread operably engaging one of the pair of jaw clamps 46', and a right-handed thread operably engaging the other of the pair of jaw clamps 46'.

A lower portion of clamp body 50'' may be threaded corresponding to and in threaded engagement with a portion of face plate threaded drive 140 such that one of the pair of clamp bodies 50'' of jaw clamps 46' is in threaded engagement with the right-handed threads on face plate threaded drive 140 and the second jaw clamp 46' is in threaded engagement with the left-handed threads on face plate threaded drive 140. The right-handed and left-handed threads are such that the pair of jaw clamps 46' move toward each other along longitudinal slot 138 when securing member 74 is loosened and threaded drive 140 is rotated in one direction, and move away from one another along longitudinal slot 138 when securing member 74 is loosened and face plate threaded drive 140 is rotated in the opposite rotation. In one example (not shown), a plurality of face plate threaded drives may be provided such that each jaw clamp is operably positioned along a face plate threaded drive. Face plate threaded drive 140 enables rapid adjustment of jaw clamps 46' along face plate 42' during change-over from one clamping configuration to another.

Figure 12:
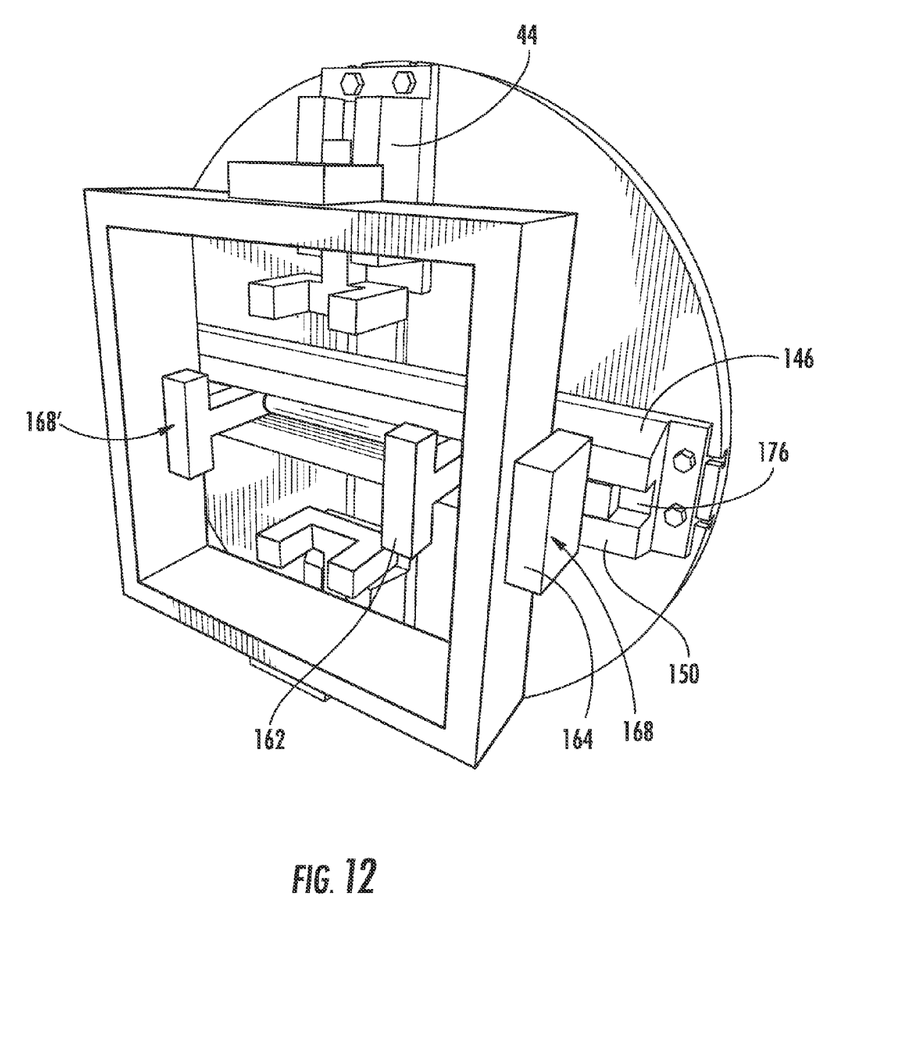
FIG. 12 is a perspective view of yet another alternative jaw clamp of the present disclosure.
Figure 13:
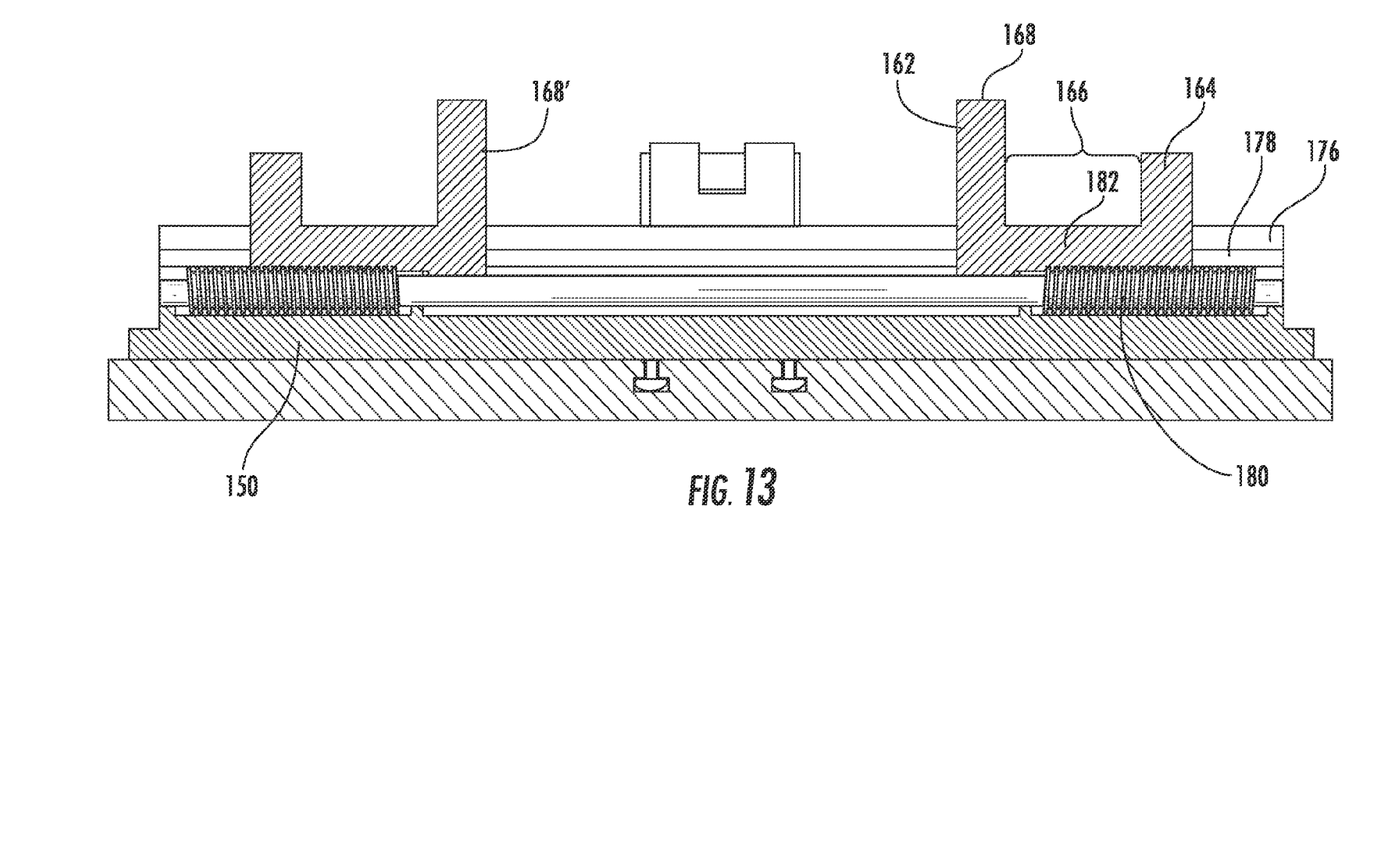
FIG. 13 is a cross sectional view through the jaw clamp of FIG. 12.

Referring now to FIGS. 12 and 13, an alternative jaw clamp 146 comprises longitudinal clamp body 150 having a generally longitudinal aperture 176 adapted for translation of two movable jaws 168 along longitudinal aperture 176 and along body 150. The pair of opposing movable jaws 168 is operably positioned in clamp body 150, the clamp body comprising threaded drive member 180 threadably engaging each of the pair of opposing movable jaws 168. Threaded drive member 180 may comprise a left-handed thread operably engaging one of the pair of first jaw clamps, and a right-handed thread operably engaging the other of the pair of first jaw clamps. Longitudinal aperture 176 and movable jaws 168 may include tongue and groove engagement 178 to retain movable jaw 168 in body 150 and transfer certain clamping loads from the movable jaw to the body.

Threaded drive member 180 is rotatably positioned in body 150 along longitudinal aperture 176. A portion of threaded drive member 180 includes right-handed threads and a portion of threaded drive member 180 includes left-handed threads. A lower portion 182 of each movable jaw 168 may be threaded corresponding to and in threaded engagement with a portion of threaded drive 180 such that one movable jaw 168 is in threaded engagement with the right-handed threads on the threaded drive member 180 and second movable jaw 168' is in threaded engagement with the left-handed threads on threaded drive member 180. The right-handed and left-handed threads are such that the movable jaws 168, 168' move toward each other along longitudinal aperture 176 and body 150 in a clamping direction when threaded drive member 180 is rotated in one direction, and movable jaws 168, 168' move away from one another along longitudinal aperture 176 and body 150 when threaded drive 180 is rotated in the opposite rotation.

Each movable jaw 168 includes inner clamp member 162 and outer clamp member 164 forming nest 166 there between. Jaw clamp 146 may be secured to faceplate mounting surface 70 using T-grooves and securing members as discussed above. Alternatively, jaw clamp 146 may be secured to faceplate mounting surface 70 by bolting to mounting surface 70 using threaded mounting holes as discussed above. Jaw clamp 146 may be affixed to face plate 42 using other mounting techniques as desired, such as welds, clamps, pins, or other mounting techniques.

Figure 15:
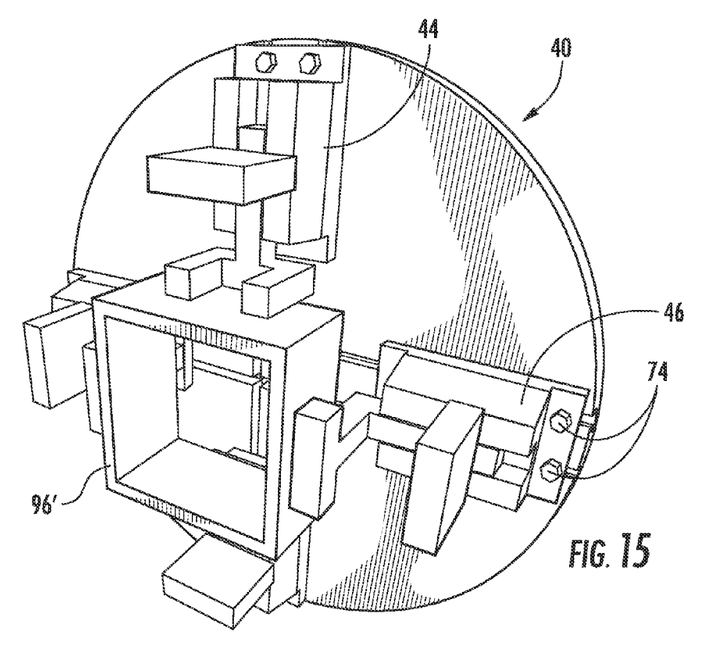
FIG. 15 is perspective view of the end clamp of the present disclosure clamping an end portion of an alternative hollow structural section.
Figure 16:
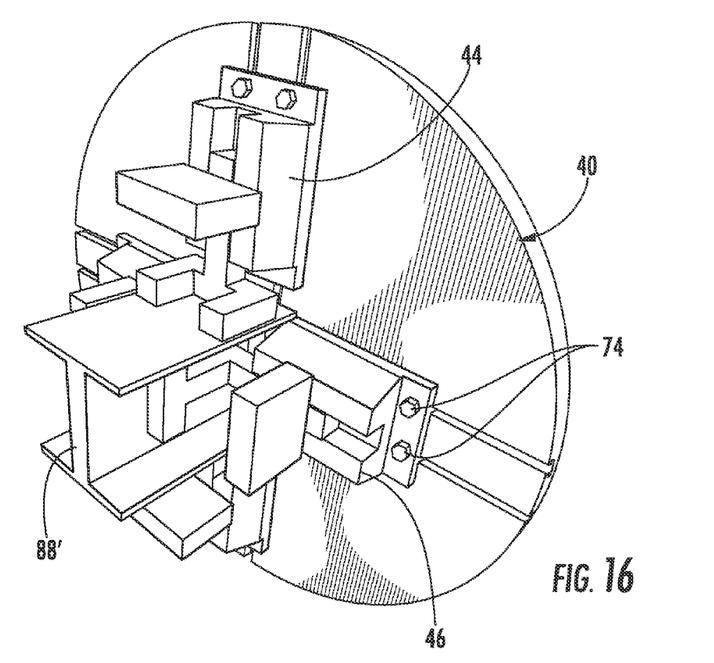
FIG. 16 is perspective view of the end clamp of the present disclosure clamping an end portion of an alternative I-beam.

End clamp 40 enables a variety of workpiece sizes and shapes to be clamped without changing jaw clamps 44, 46. End clamp 40 may be adjustable to accommodate a range of sizes of I-beams, HSS beams and columns, cruciform beams, and other beams and columns. An alternative I-beam 88' is shown in FIG. 15 clamped between the pair of first jaw clamps 44 having upper flange 90 and lower flange 92 of the I-beam clamped between the first jaw inner clamp members 52 of opposing first movable jaws 58, with web 94 of the I-beam clamped between second jaw inner clamp members 62 of opposing second movable jaws 68. As shown in FIG. 16, an alternative HSS beam 96' may be clamped between first jaw inner clamp members 52 of opposing first movable jaws 58 and second jaw inner clamp members 62 of opposing second movable jaws 68. End clamp 40 enables a variety of different beams to be clamped in end clamp 40 by adjusting the position of the jaw clamps without requiring extensive jaw clamp change-over. The pair of opposing first movable jaws 58 and the pair of opposing second movable jaws 68 may be adapted to sequentially clamp an I-beam, an HSS beam, and a cruciform beam by adjusting the position of jaw clamps 44, 46 along their respective T-grooves and operatively positioning movable jaws 58, 68 within jaw clamps 44, 46 by rotating respective threaded drive members 80.

Figure 17:
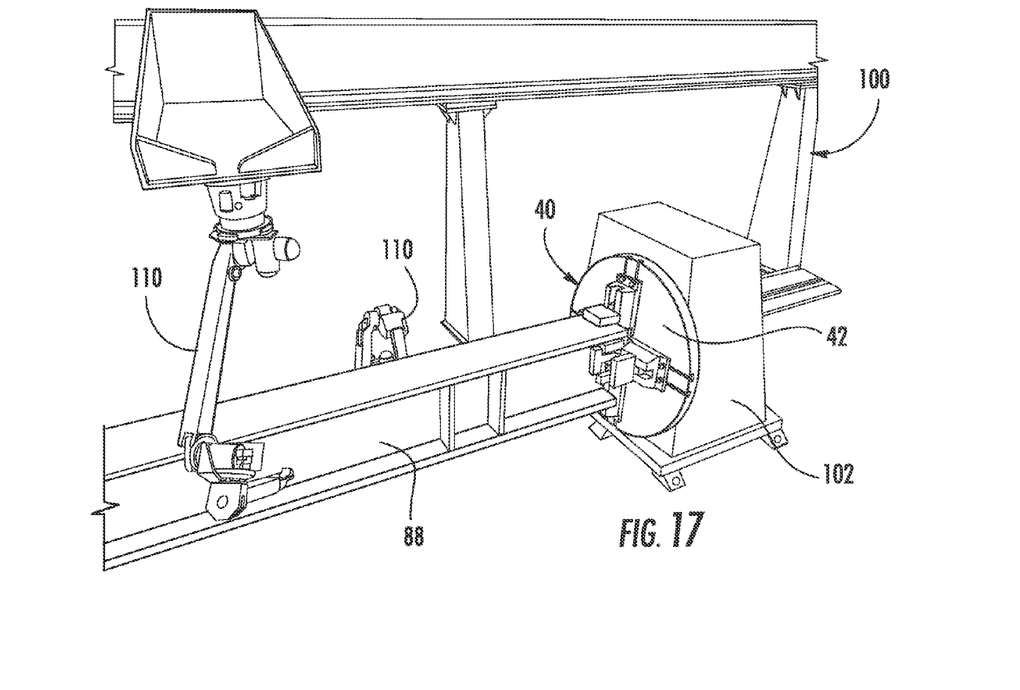
FIG. 17 is a perspective view of a structural weld station including the end clamp of the present disclosure.

As shown in FIG. 17, face plate 42 may be mounted to rotational drive 102. Rotating face plate 42 has a swing diameter equal to the largest diameter in the circular perimetric path of the rotating face plate. When face plate 42 has a circular shape rotating about the axial center of the circular plate, then the face plate swing diameter is equal to the face plate diameter. Additionally, end clamp 40 has a clamp swing diameter defined by:

$$(X^2+Y^2)^{1/2}$$

where X is the largest operable distance between first jaw outer clamp members 54 and Y is the largest operable distance Y between second jaw outer clamp members 64. End clamp 40 provides an efficient sized face plate 42 for a desired clamp swing diameter. The ratio of the face plate swing diameter to the clamp swing diameter for end clamp 40 may be between 0.8 and 1.2. Alternatively, the ratio of the face plate swing diameter to the clamp swing diameter may be between 1.0 and 1.3. Alternatively, the ratio of the face plate swing diameter to the clamp swing diameter may be between 1.0 and 1.4.

End clamp 40 may be used with welding system 100 in which portions of the workpiece are positioned for welding. In certain applications, such as a submerged arc welding station, it may be useful to locate the workpiece close to the floor for an operator to weld the workpiece positioned in end clamp 40, for weld inspection, and removal of slag from the welds. Additionally, various clips, gussets, stiffeners and other structural elements may be welded to the beam after fabrication. In other applications, the beam or other workpiece may require notching, drilling, or other operations performed or assisted by an operator. End clamp 40 enables positioning of the workpiece for operator welding, inspection, slag removal, or other operator interaction with the workpiece. Additionally, face plate 42 is typically placed such that the face plate and workpiece may be rotated about the rotational axis of the faceplate with clearance to the floor. In one configuration, face plate 42 may have a 44 inch operable distance (X) between first jaw outer clamp members 54 and a 44 inch operable distance (Y) between second jaw outer clamp members 64, and a circular face plate having a diameter of 68 inches. In this example, the face plate swing diameter is 68 inches and the clamp swing diameter is the square root of (44×44+44×44), or 62.23 inches, having a ratio of face plate swing diameter to the clamp swing diameter of 1.09. In this example, the end clamp is positionable such that the rotational axis of the face plate and workpiece is 36 inches from the floor placing the beam for efficient welding, inspection, and slag removal by an operator.

In the welding system 100 of FIG. 17, end clamp 40 may be positioned such that the rotational axis of face plate 42 is positioned between about 30 and 42 inches from the floor. In one example, the rotational axis of face plate 42 is positioned about 36 inches from the floor. Alternatively, the rotational axis of face plate 42 may be positioned between about 24 and 60 inches from the floor, or higher as desired for the welding system application.

The automated welding system 100 may comprise automated welding heads 110 movable on the welding system for welding along workpiece 88 as shown in FIG. 17. The automated welding heads may be adapted for arc welding, and may be adapted for submerged arc welding.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. An end clamp comprising:
   a face plate,
   a pair of opposing first jaws operably attached to the face plate selectively positionable toward and away from one another, each of the first jaws comprising:
      a first jaw inner clamp member and a first jaw outer clamp member forming a first nest there between, and
   a pair of opposing second jaws operably attached to the face plate selectively positionable toward and away from one another, each of the second jaws comprising:
      a second jaw inner clamp member and a second jaw outer clamp member forming a second nest there between; and
   a pair of first clamp bodies each comprising threaded drive member,
      where each of the opposing first jaws is operably positioned in a corresponding first clamp body threadably engaging the threaded drive member.

2. The end clamp of claim 1, where the face plate comprises a face plate threaded drive threadably engaging at least one of the first clamp bodies adapted for moving the at least one first clamp body along the face plate as the face plate threaded drive rotates.

3. The and clamp of claim 1, where the pair of opposing first jaws and the pair of opposing second jaws are adapted to sequentially clamp an I-beam and an HSS beam.

4. The end clamp of claim 1, where the first jaw inner clamp member comprises a U-shape.

5. The end clamp of claim 1, where the second jaw inner clamp member comprises a T-shape.

6. The end clamp of claim 1, where the pair of opposing first jaws is radially positioned.

7. An end clamp comprising:
   a face plate,
   a pair of opposing first jaws operably attached to the face plate selectively positionable toward and away from one another, each of the first jaws comprising:

a first jaw inner clamp member and a first jaw outer clamp member forming a first nest there between, and a pair of opposing second jaws operably attached to the face plate selectively positionable toward and away from one another, each of the second jaws comprising:

a second jaw inner clamp member and a second jaw outer clamp member forming a second nest there between where the pair of opposing second jaws is operably positioned in a longitudinal clamp body comprising:

a threaded drive member threadably engaging each of the opposing second jaws, the threaded drive member comprising:

a left-handed thread operably engaging one of the second jaws, and a right-handed thread operably engaging the other of the second jaws.

8. An end clamp comprising:

a face plate, a pair of opposing first jaws operably attached to the face plate selectively positionable toward and away from one another, each of the first jaws comprising:

a first jaw inner clamp member and a first jaw outer clamp member forming a first nest there between, and a pair of opposing second jaws operably attached to the face plate selectively positionable toward and away from one another, each of the second jaws comprising:

a second jaw inner clamp member and a second jaw outer clamp member forming a second nest there between, where the face plate is rotatable and having a face plate swing diameter;

where a largest operable distance X between the first jaw outer clamp members and a largest operable distance Y between the second jaw outer clamp members define a clamp swing diameter by $(X^2+Y^2)^{1/2}$; and where a ratio of the face plate swing diameter to the clamp swing diameter is between 0.8 and 1.4.

9. An end clamp comprising:

a face plate, a pair of opposing first jaws operably attached to the face plate selectively positionable toward and away from one another, each of the first taws comprising:

a first jaw inner clamp member and a first jaw outer clamp member forming a first nest there between, and a pair of opposing second jaws operably attached to the face plate selectively positionable toward and away from one another, each of the second jaws comprising:

a second jaw inner clamp member and a second jaw outer clamp member forming a second nest there between, where at least a portion of the first jaw inner clamp member is adapted to be operably positioned between the face plate and at least a portion of the second jaw inner clamp member when the second jaw member is in an extended position.

10. A means for clamping a workpiece comprising:

a face plate, a pair of selectively positionable first means for clamping, each of the first means for clamping comprising a first means for nesting a workpiece, wherein at least a portion of the first means for clamping that defines the first means for nesting is configured to contact the workpiece, and a pair of selectively positionable second means for clamping, each of the second means for clamping comprising a second means for nesting a workpiece, wherein at least a portion of the second means for clamping that defines the second means for nesting is configured to contact the workpiece; and where the face plate is rotatable and having a face plate swing diameter;

where a largest operable distance X between the first means for nesting a workpiece and a largest operable distance Y between the second means for nesting a workpiece define a clamp swing diameter by $(X^2+Y^2)^{1/2}$; and where a ratio of the face plate swing diameter to the clamp swing diameter is between 1.0 and 1.4.

11. The means for clamping a workpiece of claim 10, further comprising a means for moving each of the first means for clamping toward and away from the other.

12. The means for clamping a workpiece of claim 10, further comprising a means for concurrently moving each of the second means for clamping toward and away from the other.

13. The means for clamping a workpiece of claim 10, where the pair of first means for clamping and the pair of second means for clamping are adapted to sequentially clamp an i-beam and an HSS beam.

14. The means for clamping a workpiece of claim 10, where the pair of first means for clamping is radially positioned.

15. A means for clamping a workpiece comprising:

a face plate, a pair selectively positionable first means or clamping, each of the first means for clamping comprising a first means for nesting a workpiece, wherein at least a portion of the first means for clamping that defines the first means for nesting configured to contact the workpiece, and a pair of selective positionable second means for clamping, each of the second means for clamping comprising a second means for nesting a workpiece, wherein at least a portion of the second means for clamping that defines the second means or nesting is configured to contact the workpiece, where at least a portion of the first means for clamping is adapted to be operably positioned between the face plate and at least a portion of the second means for clamping when the second means for clamping is in an extended position.

\* \* \* \* \*